United States Patent
Ganzelmi et al.

[19]

[11] Patent Number: 6,166,593
[45] Date of Patent: Dec. 26, 2000

[54] INPUT/OUTPUT DEVICES FOR COMPLEX INTEGRATED CIRCUITS, AND ASSEMBLY METHOD THEREOF

[75] Inventors: Roberto Ganzelmi, Vittuone; Raffaele Costa, Milan; Cesare Pozzi, Capriate, all of Italy

[73] Assignee: STMicroelectronics S.r.l., Agrate Brianza, Italy

[21] Appl. No.: 09/067,762

[22] Filed: Apr. 27, 1998

[30] Foreign Application Priority Data

Apr. 29, 1997 [IT] Italy .................................. MI97A0092

[51] Int. Cl.⁷ .................................................. H01L 25/00
[52] U.S. Cl. ............................................. 327/564; 327/565
[58] Field of Search ..................................... 327/319, 564, 327/565, 108, 333; 395/842

[56] References Cited

U.S. PATENT DOCUMENTS

| | | | |
|---|---|---|---|
| 3,757,306 | 9/1973 | Boone | 327/564 |
| 5,896,549 | 4/1999 | Hansen et al. | 395/564 |

*Primary Examiner*—Dinh T. Le
*Attorney, Agent, or Firm*—Theodore E. Galanthay; Robert Iannucci; Seed IP Law Group PLLC

[57] ABSTRACT

A complex integrated circuit comprises at least a plurality of modules coupled together through at least a system channel. The circuit further comprises a plurality of input/output devices for interfacing the circuit with structures outside the circuit. The plurality of input/output devices comprise at least a first circuit portion implemented as a module coupled to the remaining modules of the circuit by the first channel system (BUS1).

20 Claims, 3 Drawing Sheets

INPUT/OUTPUT DEVICES FOR COMPLEX INTEGRATED CIRCUITS, AND ASSEMBLY METHOD THEREOF

TECHNICAL FIELD

This invention relates to input/output devices for complex integrated circuits, and to an assembly method therefor.

The invention is for application, in particular but not exclusively, to microprocessors fabricated on a single chip, and the ensuing description will cover this field of application for convenience of explanation.

BACKGROUND OF THE INVENTION

As is known, highly complex integrated circuits, such as microprocessors fabricated on a single chip, comprise a plurality of input/output devices for interfacing the circuits with external user's facilities.

Input/output devices can be programmed independently to receive data being input to the circuit or deliver output data from the circuit.

Referring to FIG. 1, an integrated circuit 1 as above comprises at least one central processing unit CPU and at least a plurality of peripheral units and internal memories PF, which in FIG. 1 have been unitized for simplicity into a single bloc designated CPU/PF.

In general, the central processing unit CPU and plurality of peripheral units and internal memories PF are implemented as plural modules, each conceived to perform a specific function.

These modules are interfaced with one another by means of a system channel, or bus, designated BUS1 in FIG. 1.

The channel BUS1 conveys system signals, which may be data, addresses, or control signals transmitted and received by the individual modules under control from the CPU.

Each module includes an interface circuit, not shown in FIG. 1 because conventional, which is arranged to interface the module with the channel BUS1, and therefore, with the other modules in the system.

The integrated circuit 1 also comprises a plurality of input/output devices I/O.

Each input/output device I/O comprises a pad P for interfacing the circuit 1 with the outside world, and a protection circuit for the pad.

This protection circuit is designated ESD in FIG. 1, and is not shown in detail because it is conventional.

Each input/output device I/O further comprises control logic circuitry LC connected to the system channel BUS1 and also omitted from FIG. 1 because conventional.

The control circuitry LC includes data registers for storing data from the channel BUS1 to be written to the pads, and data to be read from the pads and delivered on the channel BUS1.

The control circuitry also includes control registers for storing the control signals which allow the input buffer and output buffer to be driven such that the device I/O can be programmed for different configurations (bi-directional mode, input mode, o output mode).

It should be considered here that, by reason of their specific functions, the input/output devices I/O are usually designed as bits; each input/output device generally comprising 8 bits.

In the circuit 1, each bit is placed near a pad.

This conventional architecture for input/output devices I/O has significant disadvantages in terms of the area occupied by the integrated circuit and performance of the integrated circuit.

In fact, the channel BUS1, which is to serve the CPU, as well as the peripheral units and internal memories PF, and the input/output devices I/O, should have a so-called "loop" path in order for each bit to be supplied of the individual input/output devices.

This clearly requires extra area specially for the channel BUS1, in addition to the area required for supplying the CPU, peripherals and internal memories.

Furthermore, the looped path of the channel BUS1 affects the so-called "electric capacitance" of the channel, which is made higher.

A high electric capacitance involves longer propagation times for the signals along the channel, thereby limiting the "frequency" performance of the integrated circuit.

SUMMARY OF THE INVENTION

An embodiment of this invention provides input/output (I/O) devices for a complex integrated circuit, and an assembly method therefor, which have such structural and functional characteristics as to overcome the aforementioned limitations and/or drawbacks of the prior art. The integrated circuit may include a plurality of modules for processing or storing data that are coupled to each other by a system channel. The I/O devices may include a plurality of I/O pads for interfacing the circuit with structures outside the circuit. An I/O port may couple the I/O pads to the system channel and the plurality of modules.

Features and advantages of input/output devices according to the invention will be apparent from the following description of an embodiment thereof, given by way of non-limiting example with reference to the accompanying drawings.

DETAILED DESCRIPTION OF THE INVENTION

Figure 1:
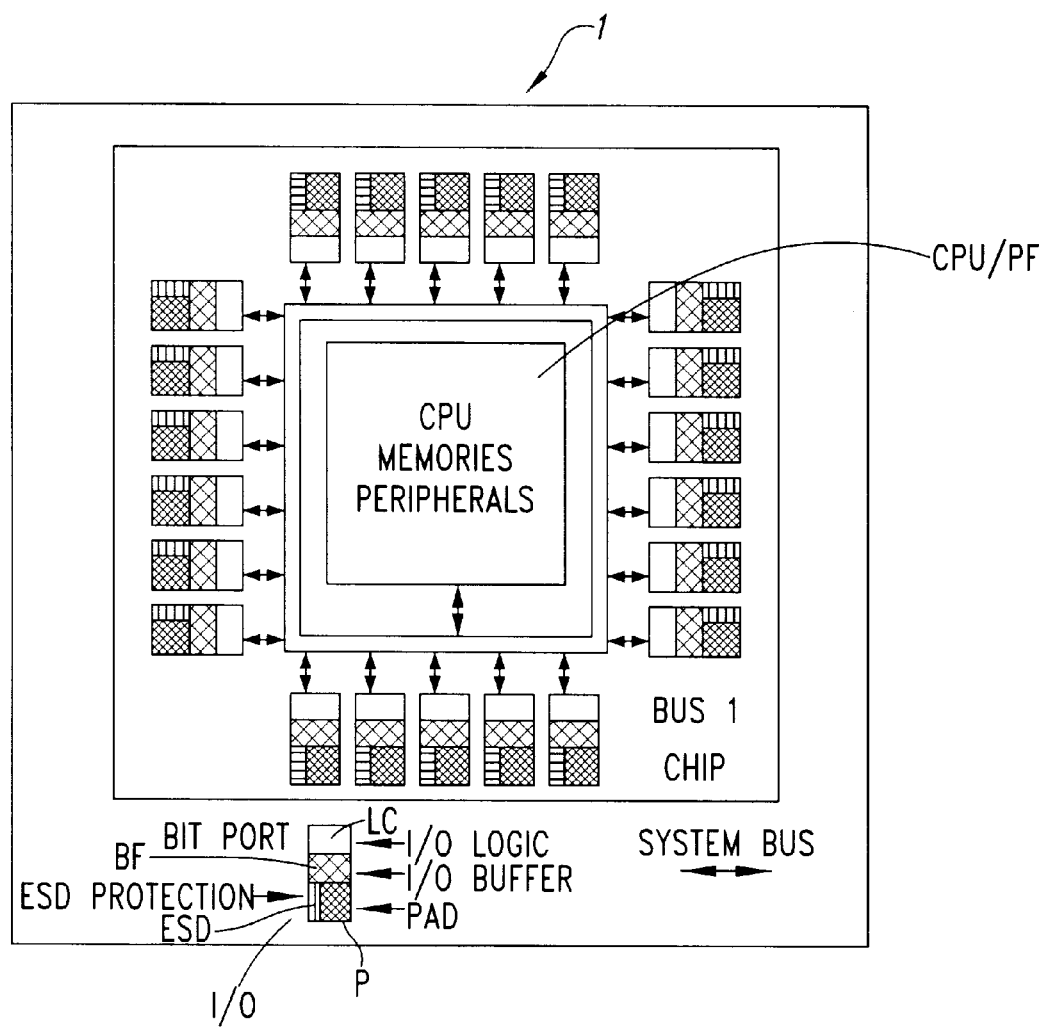
FIG. 1 shows a complex integrated circuit according to the prior art.

Referring to the drawing figures, a complex integrated circuit is generally and schematically shown at 1.

Figure 2:
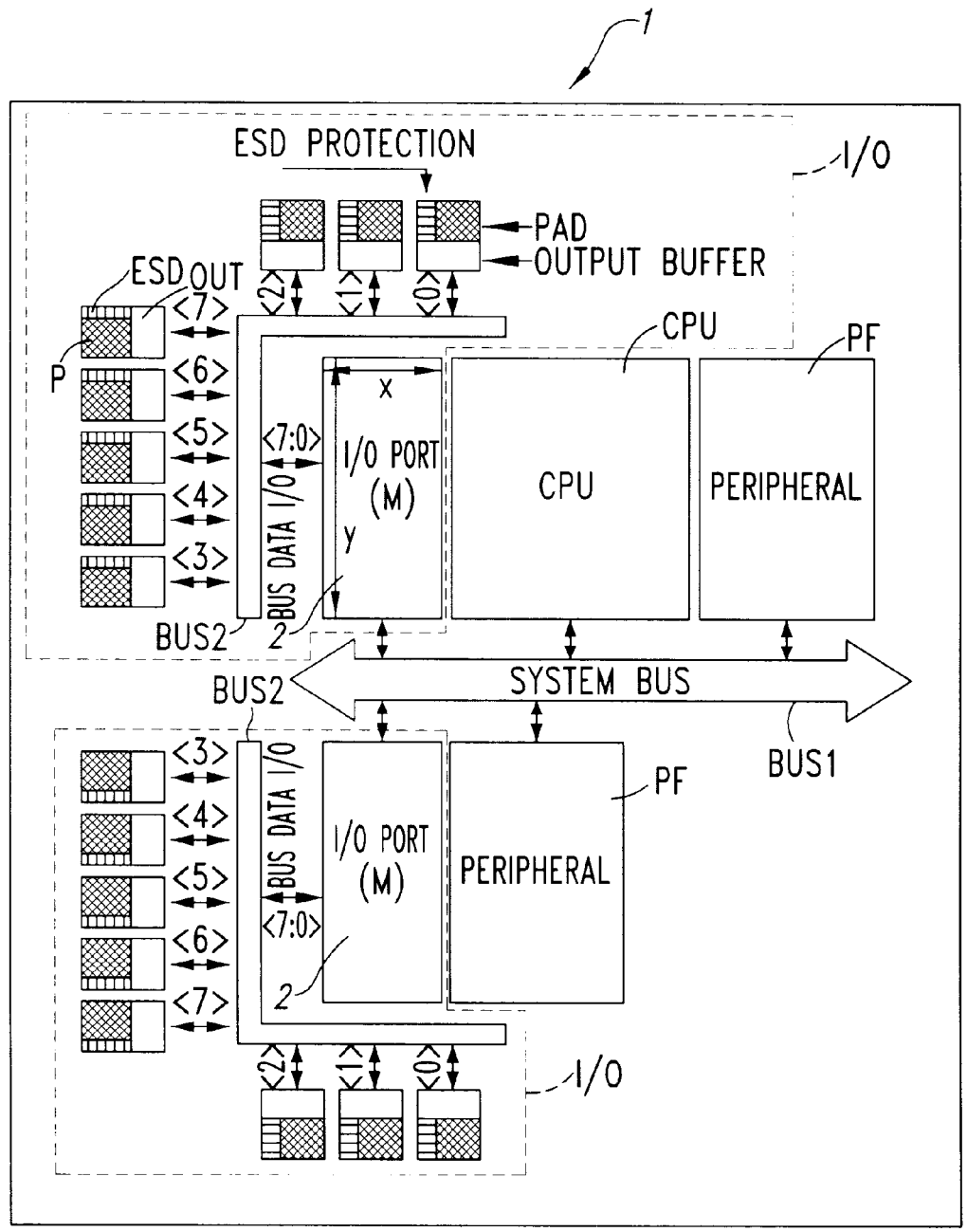
FIG. 2 shows a complex integrated circuit embodying this invention.

In particular, FIG. 2 shows an integrated circuit 1, e.g., a microprocessor fabricated on a single semiconductor chip, which comprises at least one central processing unit CPU and at least a plurality of peripheral units and internal memories PF.

In general, the central processing unit CPU and plurality of peripheral units and internal memories PF are implemented as plural modules, each intended for performing a specific function.

These modules CPU, PF are interfaced with one another by a system channel, indicated at BUS1 in FIG. 2.

The channel BUS1 conveys system signals, which may be data, addresses or control signals being transmitted and received by the individual modules CPU, PF under the CPU control.

Each module CPU, PF includes an interface circuit, not shown in FIG. 2 because it is conventional, which is provided to interface the module with the channel BUS1, and accordingly, with the other modules in the system.

The integrated circuit 1 also includes a plurality of input/output devices I/O, each comprising a first circuit portion or I/O port 2 which is implemented as a module M coupled to the remaining modules CPU, PF of the circuit 1 by means of the first system channel BUS1.

Each module M has a length Y which, in one embodiment, is substantially the same as that of the remaining modules CPU, PF of the circuit 1.

Figure 3:
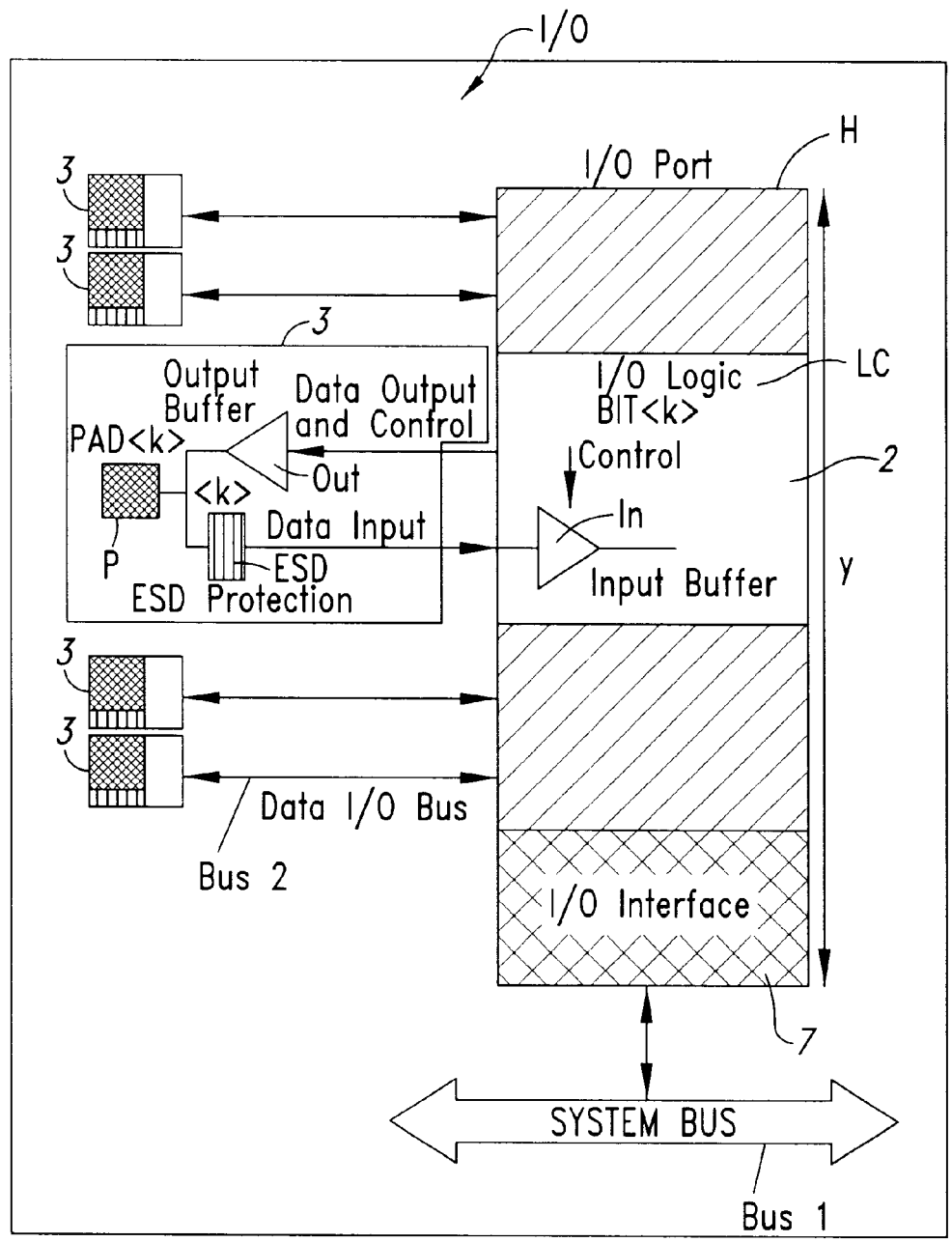
FIG. 3 shows a detail of the complex integrated circuit according to the invention.

Turning now to FIG. 3, each input/output device I/O is shown to further comprise a second circuit portion 3, located outside the module M and including an output buffer OUT coupled to a pad P.

The pad P allows the circuit 1 to be interfaced with the outside world.

The second circuit portion 3 includes a protection circuit for the pad P, indicated at ESD in FIG. 3 and not shown in detail because it is conventional.

As shown in FIG. 3, the first circuit portion 2 of each input/output device I/O comprises at least one input buffer IN and at least logic control circuitry LC, not shown in detail because it is conventional.

This control circuitry LC comprises data registers for storing data from the channel BUS1 to be written to the pads, and data to be read from the pads and delivered on the channel BUS1.

The control circuitry LC further comprises control registers for storing control signals which enable the input buffer IN and output buffer OUT to be driven so as to program the device I/O for different configurations (bi-directional mode, input mode, or output mode).

Each pad P is driven by the output buffer OUT and, in turn, drives the input buffer IN.

In the architecture just described, only the output buffer OUT remains "clamped" to the pad P, the input buffer IN and control circuitry LC being incorporated in the module M.

Also with reference to FIG. 3, it can be seen that the module M is coupled to the plurality of second circuit portions 3 of the devices I/O by at least a second transmit and/or receive channel BUS2 which extends along the dimension Y and/or a dimension X of the module M.

The first channel BUS1 is instead confined to within the base of the module M.

The second channel BUS2 has reduced electric capacitance compared to the first channel BUS1 because of its shorter length.

In addition, the channel BUS2 is less bulky than the channel BUS1 because it contains fewer signals.

In fact, by having both the input buffer IN and the control circuitry LC of each device I/O shifted to the interior of the module M, the number of signals propagated through the second channel BUS2 can be greatly reduced.

The second channel BUS2 contains essentially, for each bit, data input from the pad, data to be output to the pad, and any control signals to the output buffer (i.e., signals configuring the output buffer for open drain, signals forcing the pad to a high impedance, etc.).

On the other hand, the control signals generated to configure the input buffer (i.e., signals to disable the input buffer, signals to configure the input buffer tripping threshold) are kept confined to within the module M.

Understandably, the protection circuit ESD would be positioned near the pad P.

Further in relation to FIG. 3, the module M also comprises an input/output interface circuit 7 which is similar to those provided in conventional modules of the circuit 1.

This interface circuit 7 is connected to the first channel BUS1 for interfacing the circuit portions of the device I/O which are included in the module M with the remaining modules of the circuit 1.

In summary, the integrated circuit 1 of this invention will afford at least the following advantages:

a gain in integrated circuit area, since the first channel BUS1 is no longer to span the full perimeter of the circuit;

a gain in performance of the integrated circuit, since the first channel BUS1, now less capacitive, allows of shorter propagation times for the signals that comprise it.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A complex integrated circuit comprising,
a plurality of modules for processing or storing data;
a system bus coupling the plurality of modules to each other; and
a plurality of input/output devices for interfacing the circuit with circuit structure outside the circuit, the plurality of input/output devices cach comprising first and second circuit portions, the first circuit portion being implemented as an I/O module for interfacing with the plurality of modules of the circuit through the system channel, the second circuit portion including a buffer for coupling the first circuit portion to an I/O pad through a data I/O bus for transmission of data between a respective one of the circuit structures outside the circuit and the system bus via the first circuit portion.

2. An integrated circuit according to claim 1 wherein said system bus is located at only one side of each of the I/O module and the plurality of modules.

3. An integrated circuit according to claim 1 wherein each second circuit portion is located outside the I/O module of the first circuit portion of the input/output device in which the second circuit portion is included.

4. An integrated circuit according to claim 3 wherein the first circuit portion interfaces with a plurality of I/O pads through the data I/O bus.

5. An integrated circuit according to claim 4 wherein the data I/O bus extends along first and second sides of the I/O module.

6. An integrated circuit according to claim 5 wherein a capacitance of said data I/O bus is lower than a capacitance of the system bus.

7. An integrated circuit according to claim 1 wherein the I/O module is coupled to the system channel by an interface circuit.

8. An integrated circuit according to claim 1 wherein the plurality of modules includes a CPU and a memory.

9. A method of assembling a complex integrated circuit, the method comprising coupling together a plurality of modules by a system bus for interfacing the circuit with circuit structures outside the circuit using a plurality of input/output devices, implementing a first circuit portion of each of the plurality of input/output devices using an I/O module interfacing with the remaining modules of the circuit through the system bus, and implementing a second circuit portion of each of the plurality of input/output devices using a buffer for coupling the first circuit portion to an I/O pad through a data I/O bus for transmission of data between one of the outside circuit structures and the system bus.

10. A complex integrated circuit comprising:

a plurality of modules for processing or storing data;

a system channel coupled to each of the plurality of modules;

a first plurality of I/O pads for interfacing the circuit with circuit structures outside the circuit;

a first I/O port coupled by the system channel to the plurality of modules, the first I/O port being a module structured to couple each of the first plurality of I/O pads to the first system channel; and an I/O bus coupling each of the first plurality of I/O pads to the first I/O port.

11. The integrated circuit of claim 10, further comprising:

a second plurality of I/O pads for interfacing the circuit with structures outside the circuit; and a second I/O port coupled by the system channel to the plurality of modules, the second I/O port being a module structured to couple each of the second plurality of I/O pads to the system channel.

12. The integrated circuit of claim 10 wherein the system channel extends along only one side of each of the plurality of modules and the I/O port.

13. The integrated circuit of claim 10, further comprising an I/O bus coupling each of the first plurality of I/O pads to the first I/O port.

14. The integrated circuit of claim 10 wherein the I/O bus extends along first and second sides of the first I/O port.

15. The integrated circuit of claim 10 wherein the I/O bus has a capacitance that is lower than a capacitance of the system channel.

16. The integrated circuit of claim 10 wherein the first I/O port includes an I/O interface that couples the first I/O port to the system channel.

17. The integrated circuit of claim 10 wherein the first I/O port includes an input buffer that receives data from the first plurality of I/O pads for transmission on the system channel.

18. The integrated circuit of claim 17, further comprising a plurality of I/O modules coupled to the first I/O port, each of the plurality of I/O modules including a respective one of the first plurality of I/O pads and an output buffer that receives data from the first I/O port for transmission to the I/O pad of the I/O module.

19. The integrated circuit of claim 18 wherein each of the plurality of I/O modules includes an ESD protection circuit.

20. The integrated circuit of claim 18 wherein the first I/O port includes control logic that controls the input buffer of the first I/O port and the output buffer of each of the I/O modules.

* * * * *

UNITED STATES PATENT AND TRADEMARK OFFICE
CERTIFICATE OF CORRECTION

PATENT NO.     : 6,166,593
DATED          : December 26, 2000
INVENTOR(S)    : Roberto Ganzelmi et al.

It is certified that error appears in the above-identified patent and that said Letters Patent is hereby corrected as shown below:

<u>Title page,</u>
Item [54], Title, should read, -- INPUT/OUTPUT DEVICES FOR COMPLEX INTEGRATED CIRCUITS, AND ASSEMBLY METHOD THEREFOR --.
Item [30], Foreign Application Priority Data, should read -- MI97A 000992 --.

<u>Column 4,</u>
Line 28, "devices each comprising" should read as -- devices each comprising --.

Signed and Sealed this

Eighth Day of June, 2004

JON W. DUDAS
*Acting Director of the United States Patent and Trademark Office*